UNITED STATES PATENT OFFICE.

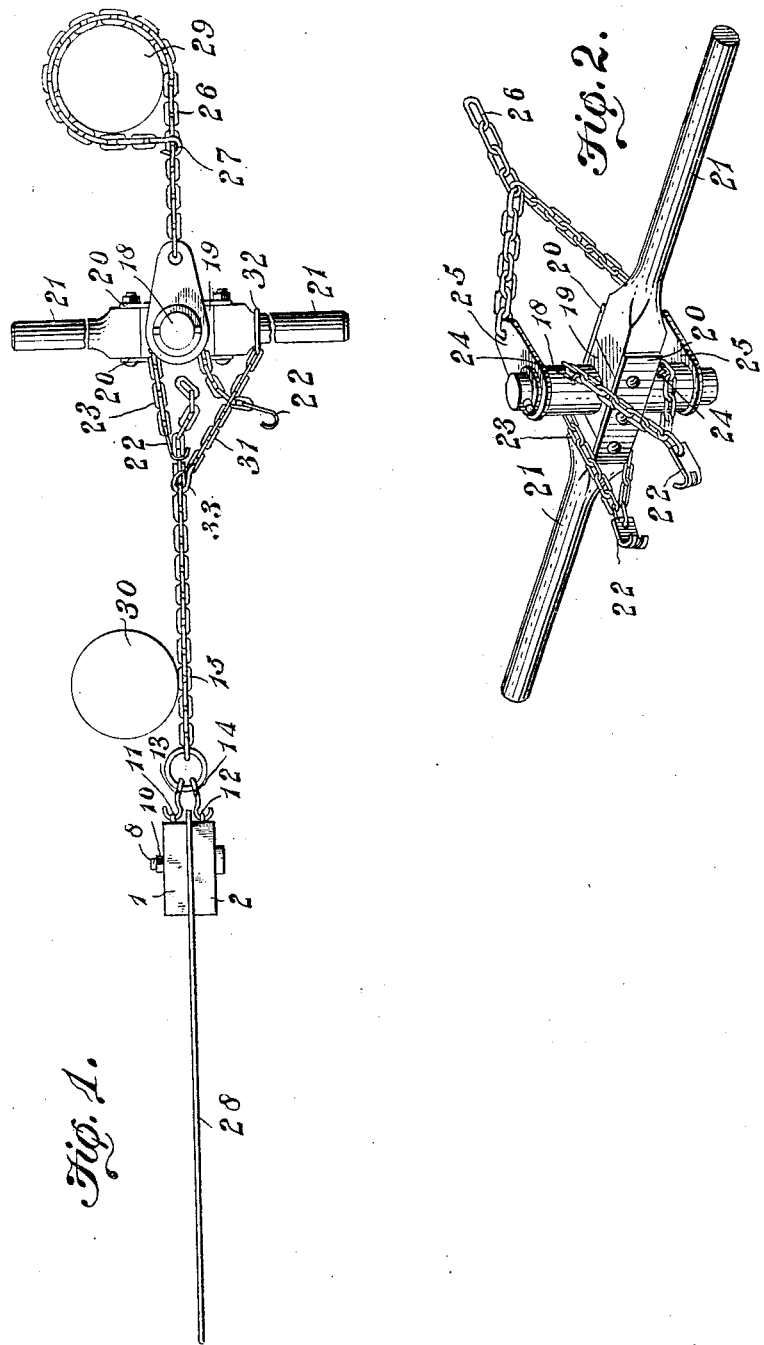

JOHN A. TYGART, OF BELLEVILLE, ARKANSAS, ASSIGNOR OF ONE-HALF TO MALANDER F. SADLER, OF BELLEVILLE, ARKANSAS.

WIRE-STRETCHER.

No. 823,087.  Specification of Letters Patent.  Patented June 12, 1906.

Application filed February 8, 1906. Serial No. 300,132.

*To all whom it may concern:*

Be it known that I, JOHN A. TYGART, a citizen of the United States, residing at Belleville, in the county of Yell and State of Arkansas, have invented a new and useful Wire-Stretcher, of which the following is a specification.

This invention relates to wire-stretchers, and is primarily designed for stretching woven-wire fences.

A further object of the invention is to provide for conveniently mounting the power element of the stretcher upon one of the fence-posts and to enable the convenient manipulation thereof so as to stretch the fencing for connection with a post in front of the post to which the power device is connected.

With these and other objects in view the present invention consists in the combination and arrangement of parts, as will be hereinafter more fully described, shown in the accompanying drawings, and particularly pointed out in the appended claims.

In the drawings, Figure 1 is a top plan view of a wire-stretcher embodying the features of the present invention. Fig. 2 is a perspective view of the power element.

Like characters of reference designate corresponding parts in both of the figures of the drawings.

The present device includes a cylindrical drum or winding element 18, provided midway of its ends with a squared enlargement or annular shoulder 19. Metallic plates 20 are suitably secured to opposite faces of the shoulder at substantially right angles to the drum and projecting beyond opposite sides of the latter so as to form spaced ears, between which are secured handle-bars 21. A pair of bifurcated hooks 22 are associated with the winding-drum, each hook being connected thereto by means of an adjustable element, preferably a chain 23, having opposite portions suitably connected to opposite end portions of the drum by means of suitable fastenings 24, the hook being connected to the chain midway between the fastenings. Each end of the drum is journaled in an arm 25, to the rear end of which is connected one member of a forked chain or flexible member 26, which is provided at its free end with a hook 27.

For use in connection with the power element there is a suitable clamp for engagement with the wire fencing, such as shown at 28, the clamp including spaced members 1 and 2 to embrace the fencing and pierced by one or more adjustable fastenings, one of such fastenings being shown at 8 in the nature of a bolt having a nut 10 to tighten the clamp upon the fastening. The clamp members 1 and 2 are provided with staples or eyes 11 and 12, with which are engaged hooks 13 and 14, carried by one end of a chain 15.

In practice, the clamp having been applied to a wire-fence fabric, one of the hooks 22 is engaged with a link of the chain 15, and the chain 26 is then passed around the fence-post 29 and its hook 27 engaged with one of the links of the chain. When thus set up, that handle-bar 21 which is adjacent the hook that is engaged with the chain 15 is swung rearwardly, thereby partially winding the adjacent flexible connection 23 on the drum 18. After the drum has been rotated to its limit in one direction the other hook 22 is engaged with the chain 15 in advance of the first-mentioned hook, whereupon the drum is eased up, so as to permit disengagement of the first-mentioned hook, after which the other handle-bar is swung rearwardly, this operation being repeated until the fence has been stretched to the desired extent—for instance, until it can be secured to the post 30.

For the purpose of holding the device under tension when engaging the respective hooks 22 with the chain 15 there is a chain 31, provided at one end with a ring 32 to fit over either of the handle-bars 21, the other end of the chain having a hook 33 to engage the chain 15, whereby the winding-drum will be held against backward rotation when engaging either of the hooks 22 with the chain 15.

If desired, either of the handle-bars 21 may be omitted or removed to facilitate the working of the device in close quarters, particularly at a fence-corner or where two fences cross one another.

Having thus described the invention, what is claimed is—

1. A wire-stretcher including a drum, a handle-bar secured to the middle of the drum, terminal bearings for the drum, a flexible element connected to the bearings and capable of being fastened around a post, hooks, and flexible elements carrying the hooks and connected to the drum at opposite sides of the handle-bar.

2. A wire-stretcher including a drum having an intermediate enlargement, plates secured to opposite sides of the enlargement and projecting beyond the drum, handle-bars secured between the projecting ends of the plates, terminal bearings for the drum, a flexible element connected to the bearings and capable of being fastened around the post, hooks, and flexible elements carrying the hooks and connected to the drum at opposite sides of the enlargement.

3. In a wire-stretcher, the combination of a clamp having a chain, a drum, handle-bars projecting radially from opposite sides of the drum and intermediate of its ends, hooks, flexible connections between the hooks and the drum, and a chain having a ring to embrace either handle-bar, and a hook for engagement with the chain of the clamp.

In testimony that I claim the foregoing as my own I have hereto affixed my signature in the presence of two witnesses.

JOHN A. TYGART

Witnesses:
J. W. WILSON,
T. L. McCORMACK.